(12) United States Patent
Cargnelli et al.

(10) Patent No.: US 7,052,791 B2
(45) Date of Patent: *May 30, 2006

(54) APPARATUS FOR HUMIDIFICATION AND TEMPERATURE CONTROL OF INCOMING FUEL CELL PROCESS GAS

(75) Inventors: Joe Cargnelli, Toronto (CA); Ravi B. Gopal, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/385,731

(22) Filed: Mar. 12, 2003

(65) Prior Publication Data

US 2003/0175568 A1 Sep. 18, 2003

Related U.S. Application Data

(60) Division of application No. 09/801,916, filed on Mar. 9, 2001, now Pat. No. 6,787,254, which is a continuation-in-part of application No. 09/628,929, filed on Jul. 28, 2000.

(51) Int. Cl.
*H01M 8/04* (2006.01)

(52) U.S. Cl. .......................... 429/26; 429/24
(58) Field of Classification Search .................. 429/13, 429/24, 26; 165/60, 228
See application file for complete search history.

(56) References Cited

U.S. PATENT DOCUMENTS

| | | | |
|---|---|---|---|
| 2,338,382 A | 1/1944 | Marlow | |
| 2,419,119 A | 4/1947 | Christensen | |
| 2,545,491 A | 3/1951 | Ohlheiser | |
| 2,825,680 A | 3/1958 | Stutz | |
| 3,415,313 A | 12/1968 | Olstad | |
| 3,424,231 A | 1/1969 | Truhan | |
| 3,617,699 A | 11/1971 | Othmer | |
| 3,671,273 A | 6/1972 | Gunter | |
| 4,044,078 A | 8/1977 | Curtis et al. | |
| 4,103,508 A | 8/1978 | Apple | |
| 4,574,062 A | 3/1986 | Weitman | |
| 4,711,294 A | 12/1987 | Jacobs et al. | |
| 4,769,998 A | 9/1988 | Oswalt | |
| 4,973,530 A | 11/1990 | Vanderborgh et al. | |
| 5,343,937 A | 9/1994 | Gross | |
| 5,382,478 A | 1/1995 | Chow et al. | |
| 5,432,020 A | 7/1995 | Fleck | |
| 5,544,275 A * | 8/1996 | Ebbing et al. | 392/480 |
| 5,786,104 A | 7/1998 | Black et al. | |

(Continued)

FOREIGN PATENT DOCUMENTS

EP 0 766 050 A2 4/1997

(Continued)

OTHER PUBLICATIONS

IPDL JPO Machine Translation for JP 2000-042350 A (publication date of Feb. 15, 2000).*

(Continued)

*Primary Examiner*—Susy Tsang-Foster
(74) *Attorney, Agent, or Firm*—Bereskin & Parr

(57) ABSTRACT

An apparatus for humidifying and controlling the temperature of a process gas stream; has a first humidification unit for super-saturating and heating the process gas stream at a first pre-set temperature; and a first heat exchanger for cooling the process gas stream until it reaches a second pre-set temperature, and for removing excess condensed water from the process gas stream. The apparatus can include a heater for heating the process gas stream until it reaches a third pre-set temperature.

17 Claims, 5 Drawing Sheets

U.S. PATENT DOCUMENTS

| | | |
|---|---|---|
| 5,815,637 A | 9/1998 | Allen et al. |
| 5,996,976 A | 12/1999 | Murphy et al. |
| 6,007,931 A | 12/1999 | Fuller et al. |
| 6,013,385 A | 1/2000 | DuBose |
| 6,045,934 A | 4/2000 | Enami |
| 6,162,554 A | 12/2000 | Nolscher et al. |
| 6,279,650 B1 * | 8/2001 | Sung .......................... 165/222 |
| 6,415,858 B1 | 7/2002 | Getchel et al. |
| 6,787,254 B1 | 9/2004 | Cargnelli et al. |
| 2002/0058168 A1 | 5/2002 | Voss |

FOREIGN PATENT DOCUMENTS

| | | | | |
|---|---|---|---|---|
| JP | 54-16836 | | | 2/1979 |
| JP | 56-119434 | | | 9/1981 |
| JP | 58-213136 | | | 12/1983 |
| JP | 4-12462 | | | 1/1992 |
| JP | 05-256468 A | * | | 10/1993 |
| JP | 7-140061 | | | 6/1995 |
| JP | 7-326376 | | | 12/1995 |
| JP | 08-106913 | | | 4/1996 |
| JP | 08-203547 A | * | | 8/1996 |
| JP | 9-35737 | | | 2/1997 |
| JP | 2000-042350 A | * | | 2/2000 |
| WO | WO 0118896 | | | 3/2001 |

OTHER PUBLICATIONS

IDPL JPO Machine Translation for JP 08-203547 A (publication date of Aug. 1996).*

IPDL JPO Machine translation for JP 05-256468 A (publication date of Oct. 1993).*

Stephen K., et al., "Catalytic Combustion of Hydrogen in a Diffusive Burner", Catalytic Combustion of Hydrogen in a Diffusive Burner, pp. 1483-1492, no date.

* cited by examiner

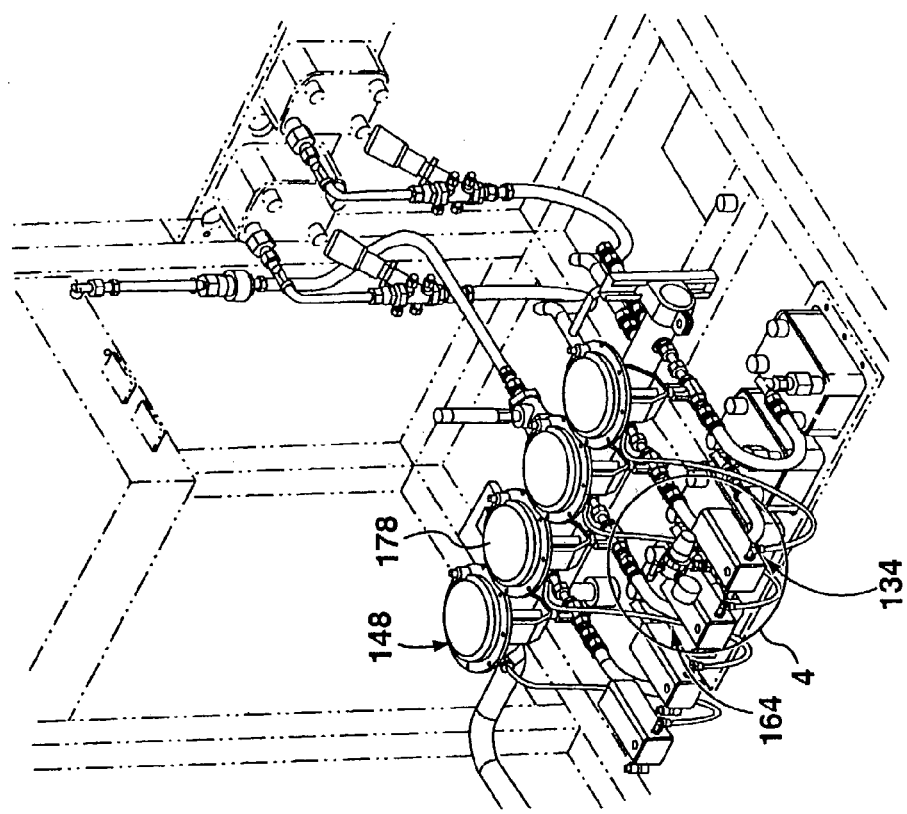
FIG. 3
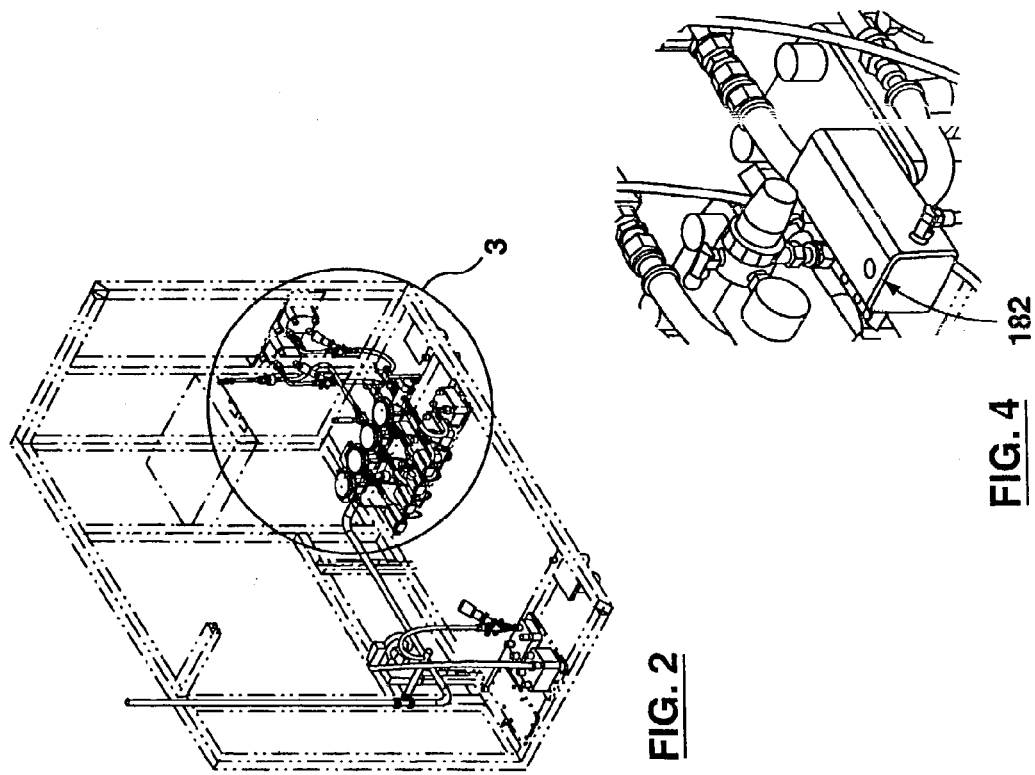
FIG. 2
FIG. 4

APPARATUS FOR HUMIDIFICATION AND TEMPERATURE CONTROL OF INCOMING FUEL CELL PROCESS GAS

RELATED APPLICATION

The following is a Division of U.S. patent application Ser. No. 09/801,916, filed Mar. 9, 2001, now U.S. Pat. No. 6,787,254, which is a Continuation-in-Part Application to U.S. patent application Ser. No. 09/628,929, filed on Jul. 28, 2000.

FIELD OF THE INVENTION

The present invention relates generally to a method and apparatus for humidifying and controlling the temperature of incoming fuel cell process gas. More particularly, the present invention relates to a humidification system capable of providing rapid, accurate and precise control of both the relative humidity and the temperature of the incoming fuel cell process gas.

BACKGROUND OF THE INVENTION

Fuel cell systems are seen as a promising alternative to traditional power generation technologies due to their low emissions, relatively high efficiency and ease of operation. Fuel cells operate to convert chemical energy into electrical energy. Proton exchange membrane fuel cells comprise an anode, a cathode, and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane and are forced to flow through an external circuit thus providing an electrical current. At the cathode, oxygen reacts at the catalyst layer, with electrons returned from the electrical circuit, to form anions. The anions formed at the cathode react with the protons that have crossed the membrane to form liquid water as the reaction product.

Proton exchange membranes require a wet medium to facilitate the migration of protons from the anode to the cathode, and otherwise to maintain the membranes electrically conductive. It has been suggested that each proton that moves through the membrane drags at least two or three water molecules with it (U.S. Pat. No. 5,996,976). U.S. Pat. No. 5,786,104 describes in more qualitative terms a mechanism termed "water pumping", which results in the transport of cations (protons) with water molecules through the membrane. As the current density increases, the number of water molecules moved through the membrane also increases. Eventually the flux of water being pulled through the membrane by the proton flux exceeds the rate at which water is replenished by diffusion. At this point the membrane begins to dry out, at least on the anode side, and its internal resistance increases. It will be appreciated that this mechanism drives water to the cathode side, and additionally the water created by reaction is formed at the cathode side. Nonetheless, it is possible for the flow of gas across the cathode side to be sufficient to remove this water, resulting in drying out on the cathode side as well. Accordingly, the surface of the membrane must remain moist at all times. Therefore, to ensure adequate efficiency, the process gases must have, on entering the fuel cell, a predetermined or set relative humidity and a predetermined or set temperature which are based on the system requirements.

A further consideration is that there is an increasing interest in using fuel cells in transport and like applications, e.g. as the basic power source for cars, buses and even larger vehicles. As compared to some stationary applications, this presents some unique requirements. More particularly, it is necessary that the power delivered by a fuel cell be capable of rapid change between different power levels, and these power levels can be quite different. Thus, in urban driving, it is common for fuel cells to be required to frequently switch between minimum, or even zero power, to a maximum power level and back again. Maintaining appropriate humidity levels under such severe operating conditions is not trivial. Additionally, a fuel cell must be capable of providing this functionality under a wide range of ambient air conditions.

Accordingly, in this art one can find numerous proposals for maintaining humidity in fuel cell systems. One conventional way to humidify a gas stream is to pass a gas as a stream of fine bubbles through water. As long as the process gas has sufficient contact time with the water, controlling the temperature of the water controls the amount of water in the gas stream. However, these bubble column type humidifiers are generally not suitable for commercial applications of fuel cells. The humidifiers tend to be large and costly. Moreover, the humidifiers are unable to react fast enough to meet the load following requirements of the fuel cell system. As a result, at high gas flow rates the system becomes unstable, unreliable and unresponsive. In addition, this humidification system never reaches 100% relative humidity in practice and this limits the flexibility or adaptability of the system.

In some prior art fuel cells, incoming process gases are humidified by flowing each gas on one side of a water vapor exchange membrane and by flowing deionized water on the opposite side of the membrane. In this way, water is osmotically transferred across the membrane to the fuel and oxidant gases. However, these systems have process parameter restraints that cause problems and inefficiencies when used in conjunction with fuel cells. Since the membrane is at the same temperature as the fuel stack, there is no independent control of the relative humidity or temperature of the process gases and thus the system is limited in its ability to adjust to different situations.

Other humidification methods include exposing the incoming process gas to a source of steam or metering in a quantity of fine water droplets into the gas supply line (U.S. Pat. No. 5,432,020). However, in the past, these systems tended to be large, complex, slow acting, and possessed inadequate dynamic controllability.

There remains a need for a humidifier that can offer rapid dynamic control, as well as precise and accurate temperatures and relative humidities for incoming fuel cell process gases. More particularly, such a humidifier should enable relative humidity and temperature to be controlled independently over a wide variety of flow rates, for both the oxidant and fuel systems.

SUMMARY OF THE INVENTION

In accordance with the invention of application Ser. No. 09/801,916, there is provided a method for humidifying a process gas stream, the method comprising the steps of:

(a) humidifying the process gas stream at a first temperature so as to provide the process gas stream with excess humidity;

(b) cooling the process gas stream at a second temperature, lower than the first temperature, to cause condensation of excess moisture;

(c) removing excess condensed moisture from the process gas stream; and (d) delivering the process gas stream at a known third temperature, whereby the relative humidity level in the process gas stream is determined from the ratio of the saturation pressures at the second and third temperatures.

In accordance with the present there is provided an apparatus for humidifying a process gas stream, for a fuel cell, the apparatus comprising: a first humidification unit having an inlet for the process gas stream, for adding humidity to the process gas stream at a first temperature, to a humidity in excess of a required humidity level;

a first heat exchanger connected to the humidification unit, for cooling the process gas stream to a second, lower temperature, whereby excess moisture in the process gas stream condenses, and for removing the condensed moisture, whereby the process gas stream leaving the heat exchanger has a known temperature and a known relative humidity level.

Corresponding to the method defined above, it is preferred to provide the apparatus in combination with a fuel cell power unit having a first process gas inlet connected to the first heat exchanger. Again, it is even more preferred for each fuel cell of the fuel cell power unit to include a proton exchange membrane, although the invention is applicable to other types of fuel cells.

The apparatus aspect of the invention can again include a first heater connected to the heat exchanger for heating the process gas stream to a third temperature greater than the second temperature, whereby the process gas stream has a known relative humidity level.

Further, for a conventional fuel cell having inlets for a fuel gas stream and an oxidant gas stream, the apparatus can include a second inlet for an oxidant gas stream, wherein the first humidification unit, the first heat exchanger and the first heater are located in a first fuel gas line connected to the first gas inlet of the fuel cell power unit, and wherein the apparatus includes a second, oxidant gas line and the apparatus includes, within the oxidant gas line:

a second humidification unit for humidifying the oxidant gas stream at a fourth temperature; and a second heat exchanger, connected to the second humidification unit, for cooling the oxidant gas stream to a fifth temperature lower than the fourth temperature, whereby excess moisture is condensed and separated from the oxidant gas stream.

BRIEF DESCRIPTION OF THE DRAWING FIGURES

For a better understanding of the present invention, and to show more clearly how it may be carried into effect, reference will now be made, by way of example, to the accompanying drawings, which show a preferred embodiment of the present invention and in which:

FIG. 2 shows a perspective view of a second embodiment of the humidification system for a fuel cell;

FIG. 3 shows a detail of FIG. 2 in a corresponding perspective view on a larger scale;

FIG. 4 shows a perspective view of part D of FIG. 3 in a corresponding perspective view on an enlarged scale;

DESCRIPTION OF THE PREFERRED EMBODIMENT

Figure 1:
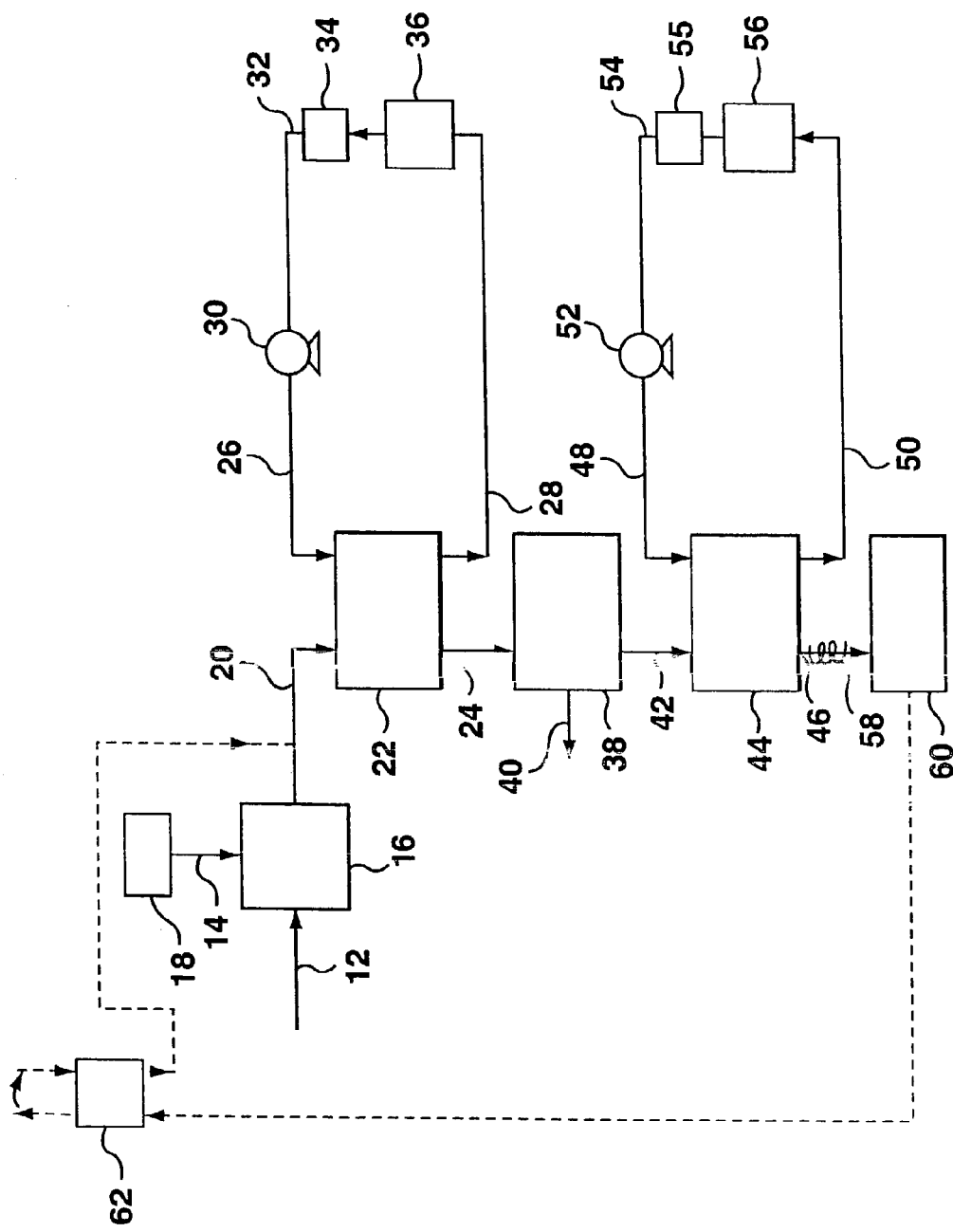
FIG. 1 illustrates a schematic flow diagram of one embodiment of a humidification system for a fuel cell.
Figure 5:
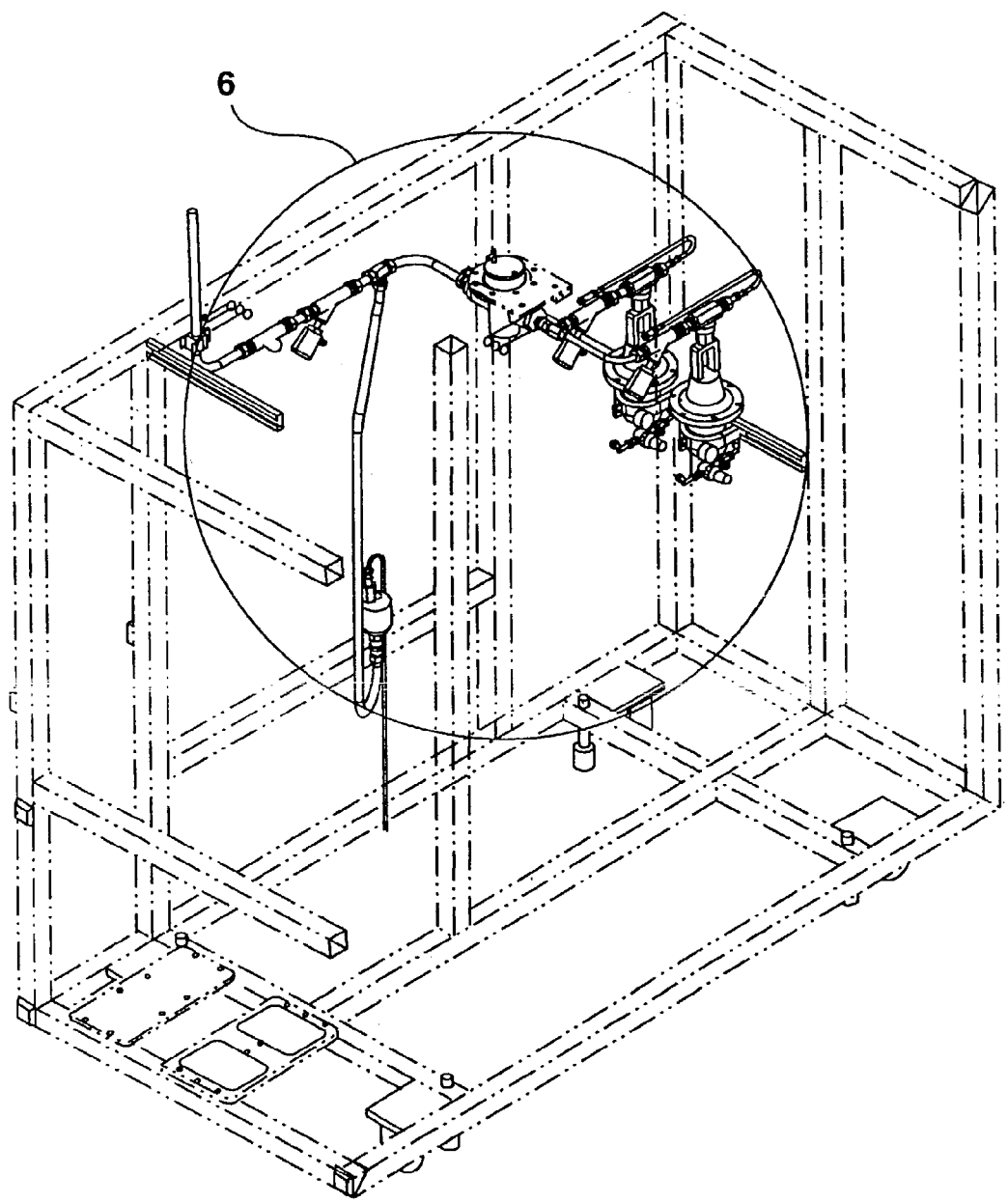
FIG. 5 shows details of elements of a steam line.
Figure 6:
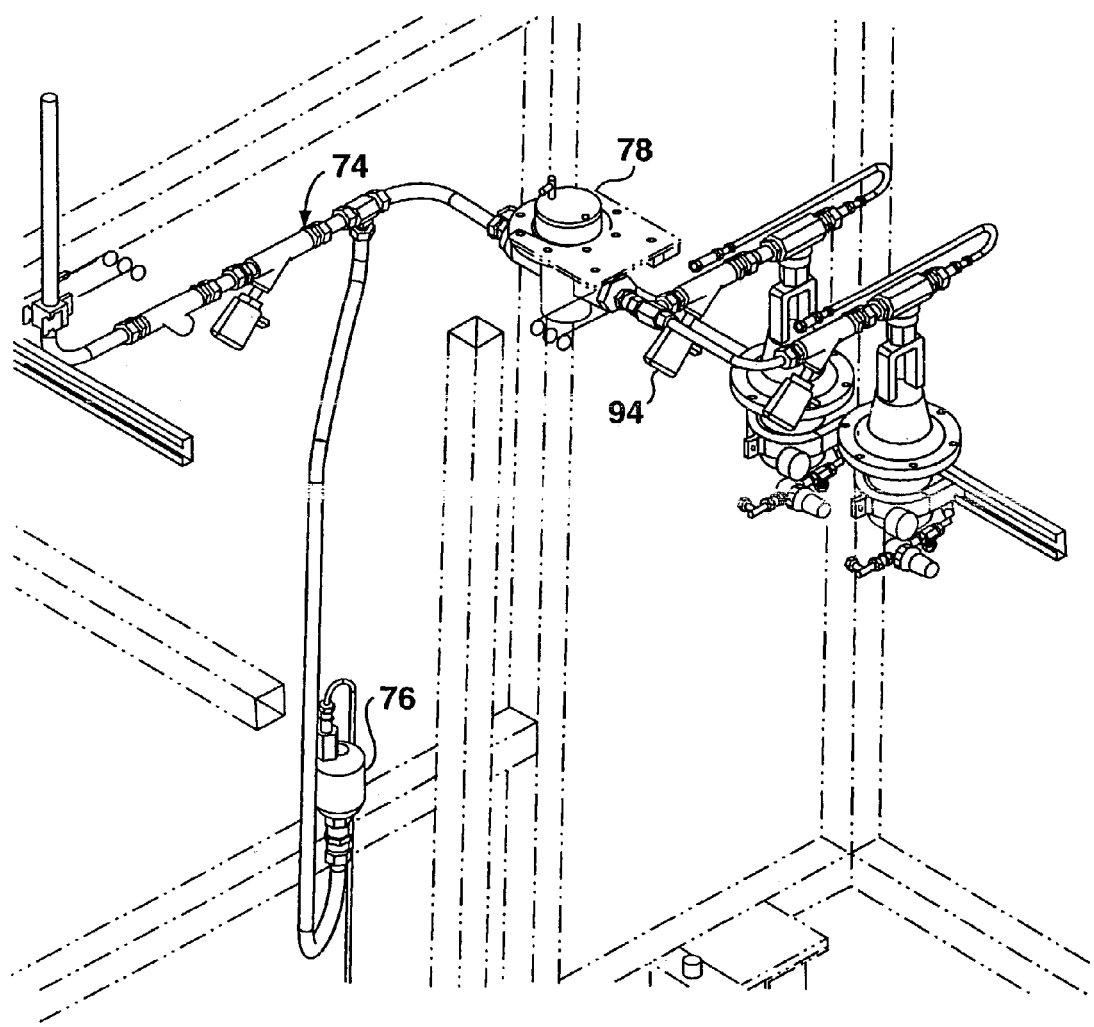
FIG. 6 shows a part of FIG. 5 on an enlarged scale.

Referring first to FIG. 1, this shows a schematic flow diagram of a process gas stream for one process gas. It is to be understood that the invention is applicable to both gases, i.e. to both of the fuel and the oxidant, and for this purpose the flow diagram of FIG. 1 would be duplicated for the two process gas lines. The embodiments of FIGS. 2–6 shows the invention as applied to both process gas lines Referring to FIG. 1, and in that process gas stream 12 and a steam line 14 are both connected to a saturator 16, for increasing the humidity of the gas stream. Steam is supplied from a steam supply indicated schematically at 18. The saturator 16 could include an injector for injecting steam into the process gas stream, so as to both heat and humidify the process gas stream.

A time 20 exits from the saturator 16 and contains super-saturated process gas. The line 20 enters a first heat exchanger 22. The first heat exchanger 22 can be a plate heat exchanger or other suitable heat exchanger, and has an inlet 26 and an outlet 28 for a water stream. It is to be understood that the stream could be comprised of at least one fluid, including but not limited to water, oil, and/or ethylene glycol. While a variety of heat exchange fluids could be used for the specific embodiments described here, all the heat exchange fluids are water in the described embodiments. The inlet and outlet 26, 28 are part of a first temperature control circuit, also referred to as a dewpoint cooling section, including a pump 30, an inlet 32 for make-up water and a third heat exchanger 34. Additionally a first water heater 36 is provided. Thus, in the first temperature control circuit, the make up water enables the level of fluid to be maintained, and this stream can be either cooled with the third heat exchanger 34 or heated with the first heater 36 to a desired temperature.

The first heat exchanger 22 has an outlet for cooled gas connected by a line 24 to a separator 38. The separator 38 is for separating water condensed out of the gas in the first heat exchanger 22, and has a discharge or outlet 40 for condensed water. An outlet of the separator 38 is connected by a further line 42 to a second heat exchanger 44.

The second heat exchanger 44 is intended to reheat the gas, and has an outlet connected to line 46 for the reheated gas. Like the first heat exchanger 22, the second heat exchanger 44 has an inlet 48 and an outlet 50 for a water heating stream. The inlet and outlet 48, 50 are part of a second temperature control circuit, also referred to as a reheating section, including a pump 52, a make-up inlet 54, a fourth heat exchanger 55, and a second water heater 56. Thus, like the arrangement of the first heat exchanger 22, the pump 52 circulates the make up water, and this stream can be either cooled with the fourth heat exchanger 55 or heated with the second heater 56 to a desired temperature.

The reheated gas with the known moisture content is then passed through line 46 to the fuel cell stack or power unit indicated schematically at 60.

The arrangement of FIG. 1 is intended to provide controlled humidification of the gas stream supplied to the fuel cell stack 60, and to enable both the temperature and humidity to be precisely controlled. This is explained further, by the detailed description of the mode of operation of the apparatus of FIG. 1. Thus, dry incoming process gas is supplied to the saturator 16, and gas is super-saturated with steam in the saturator 16, to a humidity level greater than that ultimately desired for the gas. Both the flow of the gas through line 12 and steam through line 14 are controlled and metered. The effect of injecting steam into the gas is also to heat the gas to a first pre-set temperature. Typically, on leaving the saturator 16, the gas is supersaturated at the first pre-set temperature of around 90° C., although the gas may be supersaturated at any temperature in the range of 10° C. to 120° C.

In the first heat exchanger 22, the gas is cooled down to a second pre-set temperature of, for example, 80° C. Again, for example, this temperature could be in the range 10° C. to 120° C. The effect of this is to remove excess moisture from the gas stream, and to give a humidity level equal to 100% relative humidity at the temperature to which the gas is cooled in the first heat exchanger 22.

The reason for first super-saturating and then cooling the gas to remove excess moisture is to ensure that the absolute humidity level is accurately achieved. Achieving a reliable humidity level in the saturator 16 is not practical. Thus, the approach has been taken of adding excess moisture and then removing excess moisture by condensation, since as a result the absolute humidity level is known, the gas is saturated and the dewpoint temperature of the gas is known.

The excess moisture in the gas will form droplets, and the gas with the condensed droplets is passed to the separator 38, where the condensed droplets are collected or separated from the gas flow and drained out through the outlet or discharge line 40.

The saturated gas is then passed through line 42 to the second heat exchanger 44. Here, the gas is reheated to a third pre-set temperature of, for example, 85° C. More generally, the gas can be reheated to a temperature of 10° C. to 120° C. Heating the gas will reduce the relative humidity level but the absolute humidity level will remain constant.

Thus, reheated process gas from the second heat exchanger 44, passes through line 46, and it will then have a known, third pre-set temperature and a known humidity level. As indicated schematically at 58, a heater is provided to maintain the line 46 at a constant temperature, to ensure that the gas does not cool or otherwise change in temperature during passage to the fuel cell stack 60. Practically, it has been found that heat traces, comprising electrical heating wires, wound around the line 46 provides a necessary heating function. This ensures a gas delivered to fuel cell stack 60 is at the desired temperature and with the desired humidity. The heat exchanger 44 serves to deliver the gas at the desired third temperature, and can be considered a "first heater" in the gas supply line: in contrast, the heaters 36, 56 are for heating water as a heat transfer fluid.

As mentioned above, changing demands on the fuel cell stack are accomplished by changing the flow rate for the gas passing through the line 12. If it is desired to change the temperature and/or the humidity of the gas flow then this is achieved by control of the operating conditions of the first and second heat exchangers 22, 44.

Thus, the temperature of the cooling fluid in the first temperature control loop or circuit of the first heat exchanger 22, passing through the inlet and outlet 26, 28, is controlled, so as to control the temperature of gas exiting from the heat exchanger 22, and hence the absolute humidity level of this gas.

Commonly, it is expected that gas will be cooled in the first heat exchanger 22, and the second heat exchanger 44 will ensure that the cooling water passing through the cooling loop will be at a desired temperature. The third heat exchanger 34 enables the temperature in the cooling loop to be lowered quickly if desired.

Where the operational requirement is to increase the temperature of the gas exiting from the first heat exchanger 22, then the water in the cooling loop needs to be heated. For this purpose, the first heater 36 is provided to enable the water to be rapidly heated. It has been found, in practice, that response times of less than a minute can be provided for a 12 kW fuel cell.

Correspondingly, in the second heat exchanger 44, the second heater 56 is adjusted to heat water in a cooling loop passing through the inlet and outlet 48 and 50 to the desired temperature. The fourth heat exchanger 55 enables the temperature in the cooling loop to be lowered quickly if desired.

It should be appreciated that the steam used to humidify the gas stream can be generated through the steam supplying device using water source outside fuel cell stack. However, since water is a product of the fuel cell reaction, it is more efficient to recover the water generated on the cathode side of fuel cell and use an enthalpy wheel or any other enthalpy shifting device to recover water and possibly heat from the cathode side and then transfer heat and water, in the vapor state, into the gas stream, to humidify the gas stream. As shown in FIG. 1, for this purpose, an enthalpy wheel 62 is connected to both the outlet for exhausted gas of fuel cell stack 60 and the first heat exchanger 22. In known manner, the enthalpy wheel 62 is supported on a shaft by means of bearings and rotates around its axis. The enthalpy wheel is made from appropriate materials among which is paper containing a desiccant. Humid exhausted gas from the fuel cell stack enters the enthalpy wheel 62 along the axial direction on one side where the humidity is absorbed and retained by the desiccant. On the other side of the enthalpy wheel, with respect of the shaft, dry process gas enters the enthalpy wheel in the opposite axial direction. Rotation of the enthalpy wheel causes each section of the enthalpy wheel to alternately pass through the exhausted gas stream and incoming dry process gas stream; consequently, the dry incoming process gas stream is humidified by the humidity retained in the enthalpy wheel. By appropriately selecting the pressure and temperature of both the exhausted gas and the incoming dry process gas, the process gas can be humidified in excess of the required level. If a particular pressure or a particular temperature is desired, pressure or temperature control means can be provided before the respective gas enters the enthalpy wheel. The humidified process gas is then conveyed to the first heat exchanger 22. In this way, the steam supply 18 and the saturator 16 can then be omitted and water generated from the fuel cell stack is recovered. Therefore, the design of the humidifier apparatus is simplified while the efficiency thereof significantly improves. It should be appreciated that similar enthalpy shifting devices or other humidity recovering devices can also be employed. Also, it is envisaged that the enthalpy shifting device or wheel 62 would be provided just on the cathode side, but such a device could also be provided on the anode side, either as well as or instead of the enthalpy wheel on the cathode side. As water is formed on the cathode side of the fuel cell, it is expected that recovery of water from the exhausted cathode stream will be preferred, and this could be used to humidify both the incoming anode and cathode streams.

Reference will now be made to FIGS. 2–7, which show one mode of implementation of the present invention.

Figure 7:
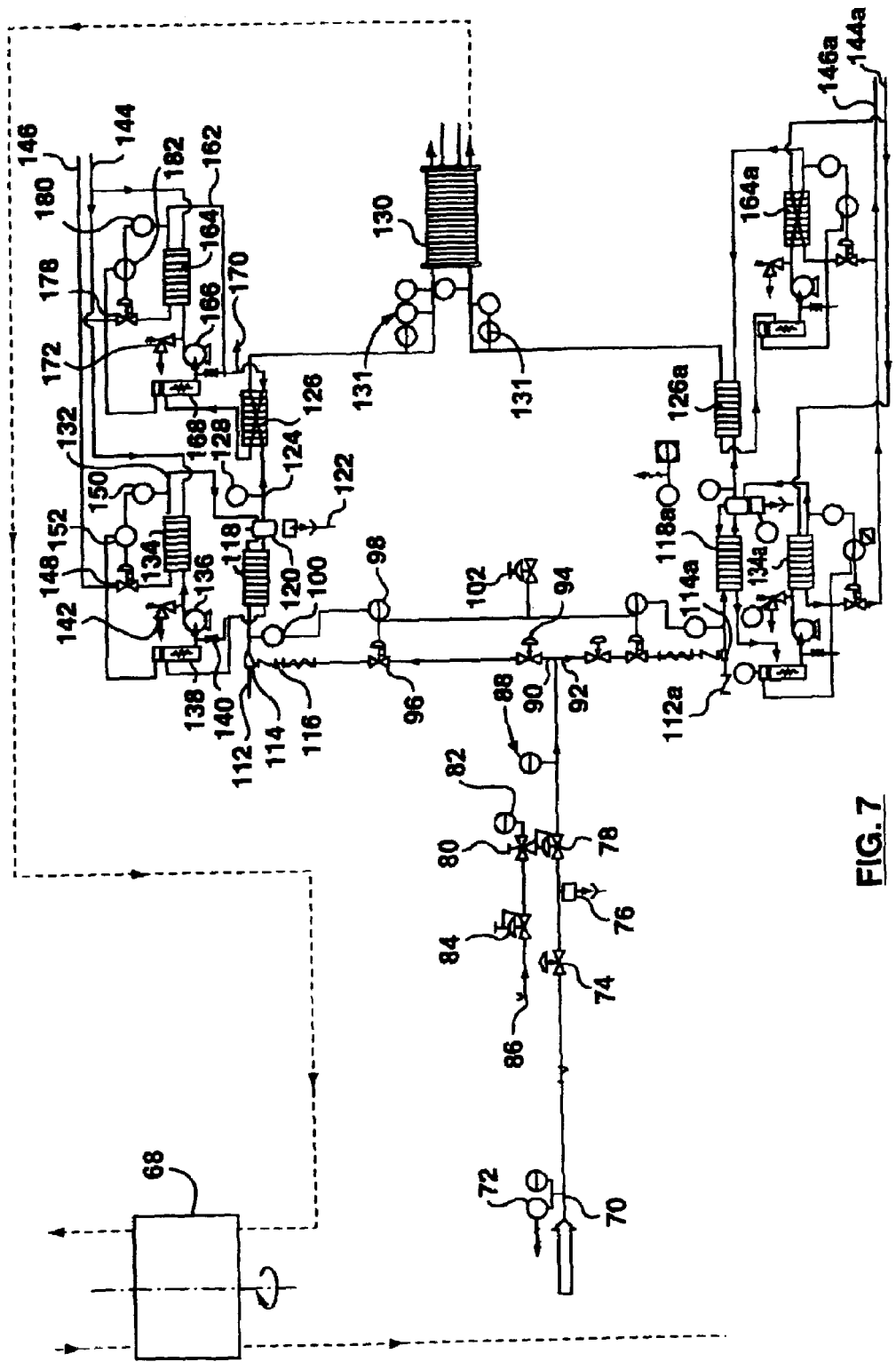
FIG. 7 shows a schematic view of the humidification system of the second embodiment.

Referring to FIG. 7, there is shown a schematic view of a humidification circuit according to a second embodiment.

Here, a steam inlet 70 is connected to a steam supply and is provided with a pressure sensor 72, connected to a pressure switch (not shown) for tripping the fuel cell system if the steam supply pressure is too low. The line 70 then passes through a main shut off valve 74 and a trap 76 is provided for draining off any condensation which may have formed. The steam line then passes through a pressure regulator 78 and includes a pressure gauge 78.

A reference inlet, e.g. for air, is provided at 86. This inlet 86 is connected through a pressure regulator 84 and a three way valve 80 (with a temperature controller 82) to the pressure regulator 78.

The steam line 70 then passes through a T-connection to two separate lines 90, 92 for supplying steam to the separate gas lines for the fuel and oxidant gases. Many elements of these two lines 90, 92 are common, and for simplicity, a description is given just of these elements in the line 90. The corresponding elements in the line 92 are given the same reference numeral but with a suffix "a", it being understood that they have essentially the same function.

Thus, the line 90 includes a steam regulator or shut off valve 94 connected to a further regulating valve 96 Valve 96 is a metering valve which controls the flow of steam into the gas lines. The valve 96 is connected to a temperature controller 98 and a back pressure regulator 102.

A fuel gas is supplied through a line 112. Steam is injected into the fuel gas at an injection port 114. Steam is supplied to injection port 114 through a non-return valve 116. Correspondingly, on the oxidant side, there is a supply line 112a, for example for air, and a steam injection port 114a. A temperature sensor is provided at 100.

The fuel gas containing steam, which is then in a supersaturated condition passes through a first heat exchanger 118, which is cooled, so as to promote condensation of excess moisture.

The cooled fuel gas then passes to a separator 120 with a trap and drain arrangement 122, for separating out also droplets. The fuel gas with 100% relative humidity then flows through a line 124, that is insulated to maintain the temperature and humidity level of the fuel gas to a second heat exchanger 126. A temperature sensor 128 is provided downstream from a separator 120, for detecting the temperature of the fuel gas stream. Knowing that the fuel gas stream will be at a 100% relative humidity, the absolute humidity of the gas stream can be determined. The heat exchanger 126, and the corresponding heat exchanger 126a in the oxidant supply line, again can be considered as heaters in the respective process as supply lines.

From the second heat exchanger 126, the fuel gas flows to the fuel cell stack indicated at 130. Again, standard sensors can be provided as indicated at 131, immediately before the inlet to the fuel cell.

Each of the first and second heat exchangers 118, 126 has its respective temperature control circuit, and these are now described separately.

Referring first to the first heat exchanger 118, a temperature control circuit indicated at generally 132 includes a first secondary heat exchanger 134, a pump 136 and a heater 138.

Auxiliary elements of the circuit include a connection 140 for make up water and a pressure relief valve 142. Chilled cooling water is supplied to the secondary heat exchanger 134 through supply and return lines 144 and 146 with a control valve being provided at 148. A temperature sensor 150 is provided in the cooling circuit, to enable the temperature in the first heat exchanger 118 to be set as desired. Other standard control elements would be provided as required. For example, a temperature controller 152 is connected to the temperature sensor 150 and to the heater 138, and also to the control valve 148. Thus, the temperature controller 152 can open the valve 148 to increase the flow of cooling water to cool down the temperature in the circuit, or alternatively actuate the heater 138 to increase the temperature in the circuit, as required.

The temperature control circuit for the second heat exchanger 126 generally corresponds. Thus, the circuit is indicated at 162, and includes a second secondary heat exchanger 164, a pump 166 and a heater 168. A make up inlet 170 is provided, together with a pressure release valve 172.

The chilled water supply and return lines 144, 146 are connected through the second secondary heat exchanger 164, through a control valve 178.

A temperature sensor 180 is connected to the second temperature control circuit 162, and a temperature controller 182 is connected to a temperature sensor 180, control valve 178 and the heater 168, for control as for the first temperature control circuit 132.

Still referring to FIG. 7, as an improvement, humidification and heating of the process gas for the cathode stream, to the first temperature, can be effected with an enthalpy wheel or any other humidity recovering device as shown schematically at 68. In the same way as described in the first embodiment, the exhausted oxidant gas containing humidity generated by the fuel cell 130 is supplied to the enthalpy wheel 68. In the enthalpy wheel 68 heat and humidity in the exhausted gas are recovered and transferred, to heat and to humidify the incoming process gas entering the enthalpy wheel 68 in the opposite axial directly to the exhausted gas. The humidified process gas is then conveyed to the inlet 112a. Since the principle of the humidity unit is same as that described in the first embodiment, for the purpose of simplicity, it is not explained in any further detail here. For some applications, it may be desirable to provide an enthalpy wheel for the anode stream as well. Where adequate humidification is provides in this manner, the steam supply and associated components can be omitted.

The present invention has many advantages over the prior art. The combination of the dewpoint cooling section and the reheating section allows rapid changes in operating conditions, with typical response times which are less than one minute. Furthermore, the system can be dynamically controlled to provide precise and accurate inlet fuel process gas stream temperatures and relative humidities, which are both essential for the efficient operation of a proton exchange membrane fuel cell over a wide range of current densities.

While the above description constitutes the preferred embodiments, it will be appreciated that the present invention is susceptible to modification and change without departing from the fair meaning of the proper scope of the accompanying claims. For example, the temperature control device can be in various forms in addition to the temperature sensor, heater and cooler described in the above embodiment. The steam supply may not necessarily be as described in the embodiment. Otherwise, it can be any enthalpy shifting device or any humidity recovering unit. Moreover, the present invention might have applicability in other types of fuel cells, which include but are not limited to, solid oxide, alkaline, molton-carbonate, and phosphoric acid. In particular, the present invention may be applied to fuel cells which operate at much higher temperatures. As will be appreciated by those skilled in the art, the requirement for humidification is very dependent on the electrolyte used and also the temperature and pressure of operation of the fuel cell. Accordingly, it will be understood that the present invention may not be applicable to all other types of fuel cells.

While the invention has general applicability to fuel cells, fuel cell stacks and fuel cell power units in any application, it is expected that the invention has particular applicability to fuel cell power units for vehicles as fuel cell stacks or power units are currently being proposed for various automotive applications, including automobiles, buses and the like.

Automotive applications are quite different from many stationary applications. For example in stationary applications, fuel cell stacks are commonly used as an electrical power source and are simply expected to run at a relatively constant power level for an extended period of time. In contrast, in an automotive environment, the actual power required from the fuel cell stack can vary widely. Additionally, the fuel cell stack supply unit is expected to respond rapidly to changes in power demand, whether these be demands for increased or reduced power, while maintaining high efficiencies. Further, for automotive applications, a fuel cell power unit is expected to operate under an extreme range of ambient temperature and humidity conditions.

All of these requirements are exceedingly demanding and make it difficult to ensure that a fuel cell stack will operate efficiently under all the possible range of operating conditions. While the key issues are ensuring that a fuel cell power unit can always supply a high power level and at a high efficiency, accurately controlling humidity levels within the fuel cell power unit is necessary to meet these requirements. More particularly, it is necessary to control humidity levels in both the oxidant and fuel gas streams. Most known techniques of humidification are ill designed to respond to rapidly changing conditions, temperatures and the like. Many known systems can provide inadequate humidification levels, and may have a high thermal inertia and/or large dead volumes, so as to render them incapable of rapid response to changing conditions.

In contrast, the technique of the present invention is intended to enable humidity levels to be controlled accurately and to be changed rapidly on a very short time scale, for example of the order of tens of seconds. The basic concept behind the method and apparatus of the present invention is a three-step process comprising: over-humidifying the relevant gas stream; cooling the gas stream to condense out excess water, recognizing that at any temperature, the humidity level of a fully saturated gas stream will be known; and then, where required, reheating the gas stream to a higher, final temperature to give a gas stream having a desired temperature and a desired relative humidity.

In automotive applications, it is expected that techniques will be adapted to give good energy efficiency. For example, the final heater for reheating the gas stream could form part of the cooler for cooling the gas stream to condense out excess water vapor. In other words gas passing through the heat exchanger to a water separator would transfer heat to gas passing out of the separator so as to reheat that gas flow.

The invention claimed is:

1. An apparatus for humidifying a process gas stream, in combination with a fuel cell stack, the combination comprising:

a first humidification unit having an inlet for the process gas stream, for adding humidity to the process gas stream at a first temperature, to a humidity in excess of a required humidity level;

a first heat exchanger connected to the first humidification unit, for cooling the process gas stream to a second, lower temperature, whereby excess moisture in the process gas stream condenses, and for removing the condensed moisture, whereby the process gas stream leaving the first heat exchanger has a known temperature and a known absolute humidity level;

a fuel cell stack having a first process gas inlet connected to the first heat exchanger, and a first outlet for exhausted process gas;

a second heat exchanger connected between the first heat exchanger and the fuel cell stack, for heating the process gas stream to a third temperature, greater than the second temperature, whereby the process gas stream has a known relative humidity level;

a common coolant supply;

a first temperature control circuit including the first heat exchanger and a third heat exchanger connected to the common coolant supply; and a second temperature control circuit including the second heat exchanger and a fourth heat exchanger connected to the common coolant supply.

2. An apparatus as claimed in claim 1, wherein each fuel cell of the fuel cell stack includes a proton exchange membrane.

3. An apparatus as claimed in claim 1, wherein the first humidification unit includes a steam injector for injecting steam into the process gas stream.

4. An apparatus as claimed in claim 1, which includes a humidity recovery unit connected to the exhausted process gas outlet of the fuel cell stack for recovering humidity in the exhausted gas generated by the fuel cell stack and for using the recovered humidity to humidify the process gas upstream of the fuel cell stack.

5. An apparatus as claimed in claim 1 or 2, wherein a first outlet line is provided connecting the second fuel heat exchanger to the fuel cell stack, and wherein a first elongated heating means is provided for maintaining process gas in the first outlet line at the third temperature.

6. An apparatus for humidifying fuel and oxidant gas streams in combination with a fuel cell stack, the combination comprising:

a first fuel humidification unit having an inlet for the fuel gas stream for adding humidity to the fuel gas stream at a first temperature, to a humidity in excess of a required humidity level;

a first fuel heat exchanger connected to the first humidification unit for cooling the fuel gas stream to a second, lower temperature, whereby excess moisture in the fuel gas stream condenses, and for removing the condensed moisture whereby the fuel gas stream leaving the first fuel heat exchanger has a known temperature and a known absolute humidity level;

a second fuel heat exchanger connected to the first fuel heat exchanger, for heating the fuel gas to a third temperature, greater than the second temperature, whereby the fuel gas has a known relative humidity level;

a fuel cell stack having a fuel gas inlet connected to an outlet of the second fuel heat exchanger, a first outlet for fuel gas, an oxidant inlet and a second outlet for exhausted oxidant;

a second oxidant humidification unit for humidifying the oxidant gas stream at a fourth temperature;

a first oxidant heat exchanger, connected to the second oxidant humidification unit, for cooling the oxidant gas stream to a fifth temperature lower than the fourth temperature, whereby excess moisture is condensed and separated from the oxidant gas stream;

a second, oxidant heat exchanger connected between the first oxidant heat exchanger and the oxidant inlet of the fuel cell stack, for heating the oxidant gas to a sixth temperature greater than the fifth temperature, whereby the oxidant gas stream has a known relative humidity level;

a first fuel temperature control circuit including the first fuel heat exchanger and a third fuel heat exchanger;

a second fuel temperature control circuit including the second fuel heat exchanger and a fourth fuel heat exchanger;

a first common coolant supply connected to the third and fourth fuel heat exchangers, for cooling the first and second fuel temperature control circuits;

a first oxidant temperature control circuit including the first oxidant heat exchanger and a third oxidant heat exchanger;

a second oxidant temperature control circuit including the second oxidant heat exchanger and a fourth oxidant heat exchanger; and a second common coolant supply connected to the third and fourth oxidant heat exchangers, for cooling the first and second oxidant temperature control circuits.

7. An apparatus as claimed in claim 6, wherein each of the first and second humidification units includes a steam injector for injecting steam in the respective gas stream.

8. An apparatus as claimed in claim 6, wherein at least one of the temperature control circuits includes a conduit for a fluid, a pump for pumping the fluid, and means for cooling the fluid.

9. An apparatus as claimed in claim 8, wherein at least one of the first temperature control circuits additionally includes a further heater for heating the respective fluid.

10. An apparatus as claimed in claim 6, 7, 8 or 9, wherein the fuel and oxidant inlets of the fuel cell stack are connected by respective fuel and oxidant lines to the second fuel heat exchangers and the second oxidant heat exchanger, and wherein first and second elongated heating means are provided for each of the fuel gas line and the oxidant gas line upstream from the fuel cell stack, for maintaining gases therein at the third and sixth temperatures respectively.

11. An apparatus as claimed in claim 6, including an enthalpy shifting means connected to at least one of the first and second outlets for exhausted process gases of the fuel cell stack and at least one of the process gas inlets of the fuel cell stack, for transferring heat and moisture from at least one of the exhausted process gas streams to at least one of the incoming process gas streams.

12. An apparatus as claimed in claim 11, wherein the enthalpy shifting device comprises an enthalpy wheel.

13. An apparatus as claimed in claim 11, wherein the enthalpy shifting means is connected to the second outlet of the fuel cell stack and to the oxidant inlet.

14. An apparatus as claimed in claim 13, wherein the enthalpy shifting means is additionally connected to the process gas inlets, for transferring heat and moisture from the exhausted oxidant stream to the incoming fuel and oxidant gas streams.

15. An apparatus for humidifying a process gas stream, in combination with a fuel cell stack, the combination comprising:

a first humidification unit having an inlet for the process gas stream, for adding humidity to the process gas stream at a first temperature, to a humidity in excess of a required humidity level;

a first heat exchanger connected to the first humidification unit, for cooling the process gas stream to a second, lower temperature, whereby excess moisture in the process gas stream condenses, and for removing the condensed moisture, whereby the process gas stream leaving the first heat exchanger has a known temperature and a known absolute humidity level; and a fuel cell stack having a first process gas inlet connected to the first heat exchanger, and a first outlet for exhausted process gas;

wherein the apparatus includes an enthalpy shifting means connected to the inlet of the first humidification unit and to the first outlet of the fuel cell stack, for exchanging heat and moisture between the process gas stream and the exhausted process gas.

16. An apparatus as claimed in claim 15, wherein the enthalpy shifting means comprises an enthalpy wheel.

17. An apparatus as claimed in claim 16, wherein the process gas stream comprises an oxidant stream, wherein the process gas inlet and the outlet for exhausted process gas of the fuel cell stack are connected to a cathode of the fuel cell stack.

* * * * *